(No Model.) 8 Sheets—Sheet 1.

H. COOK.
MANUAL RECORDER AND INDICATOR.

No. 525,839. Patented Sept. 11, 1894.

WITNESSES:
INVENTOR,
Hugo Cook
BY Edward Rector
his ATTORNEY.

(No Model.) 8 Sheets—Sheet 2.

H. COOK.
MANUAL RECORDER AND INDICATOR.

No. 525,839. Patented Sept. 11, 1894.

WITNESSES:
S. W. Brainard.
J. S. Gleason.

INVENTOR,
Hugo Cook
BY Edward Rector
his ATTORNEY.

(No Model.) 8 Sheets—Sheet 6.

H. COOK.
MANUAL RECORDER AND INDICATOR.

No. 525,839. Patented Sept. 11, 1894.

WITNESSES:
S. M. Brainard
G. S. Gleason

INVENTOR.
Hugo Cook
BY Edward Rector
his ATTORNEY.

(No Model.) 8 Sheets—Sheet 7.
H. COOK.
MANUAL RECORDER AND INDICATOR.

No. 525,839. Patented Sept. 11, 1894.

Fig. 16.

Witnesses
Martin H. Olsen.
Ruben B. Caffray.

Inventor
Hugo Cook
by Edward Rector
his Atty.

UNITED STATES PATENT OFFICE.

HUGO COOK, OF DAYTON, OHIO.

MANUAL RECORDER AND INDICATOR.

SPECIFICATION forming part of Letters Patent No. 525,839, dated September 11, 1894.

Application filed February 17, 1894. Serial No. 500,554. (No model.)

*To all whom it may concern:*

Be it known that I, HUGO COOK, a citizen of the United States, residing at Dayton, in the county of Montgomery and State of Ohio, have invented certain new and useful Improvements in Manual Recorders and Indicators, of which the following is a description, reference being had to the accompanying drawings, forming part of this specification.

My improved machine consists of a combined autographic register or manual recorder, an automatic money-drawer, and an indicating mechanism for indicating the different classes of sales or transactions. Its novelty relates to improvements in these several features both separately and combined, as will be hereinafter set forth and particularly pointed out in the claims.

In the accompanying drawings Fig. 6, a vertical section of the machine approximately on the line 6—6 of Fig. 3; Fig. $6^a$, a sectional detail of one pair of gripping rollers.

The same letters and figures of reference are used to indicate identical parts in all the figures.

Figure 3:
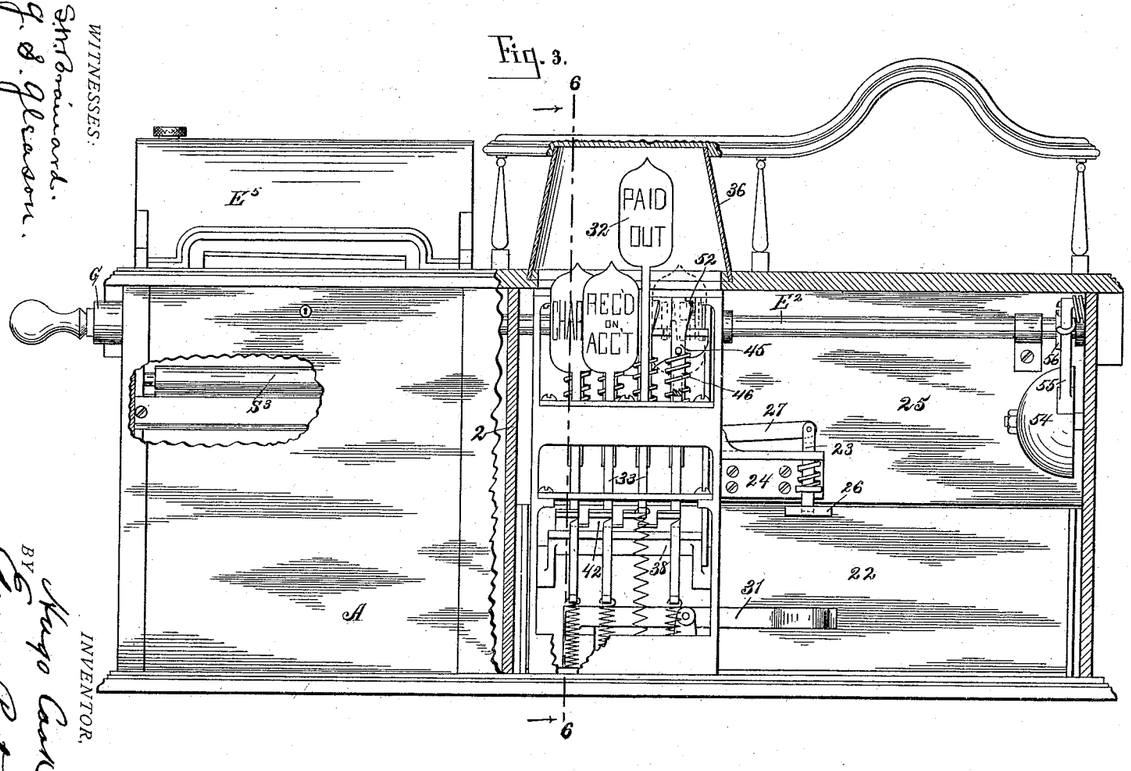
Fig. 3, a rear elevation of the machine with part of the casing in section to expose the parts within.
Figures 4, 5:
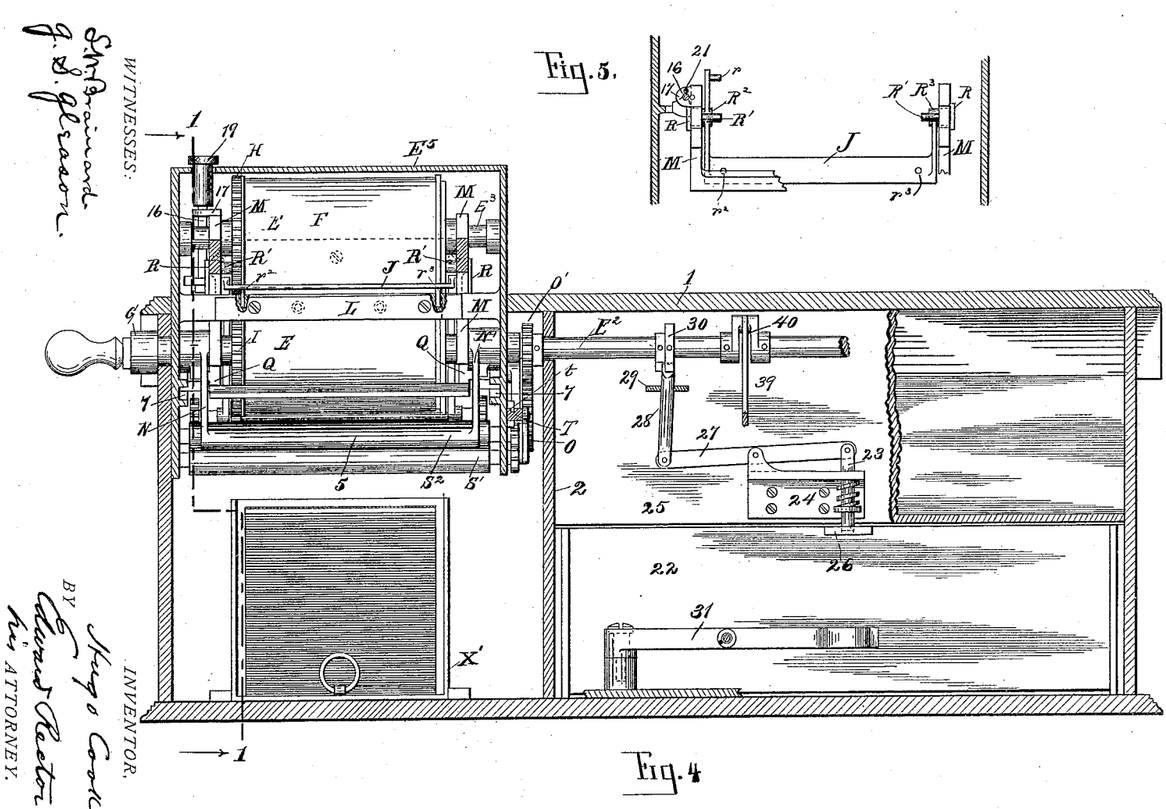
Fig. 4, a vertical cross section of the machine approximately on the line 4—4 of Fig. 1.
Fig. 5, a detail plan view of the paper clamp.

The casing 1 of the machine is divided by a partition 2, Figs. 3 and 5, extending from front to rear of it a little to the right of its middle, into two compartments. In the right hand narrow compartment is located the manual recording mechanism, and in the left hand wider compartment the money drawer and indicating and alarm mechanisms. The right hand compartment is further divided by a transverse partition 3, Fig. 1, into a front and rear portion, the former containing the supply rolls of the paper strips and the latter the folding mechanism for the record-strip and the storage tray for the folded strip. Above the partition 3, between the two compartments, are located the feed-rollers for advancing the paper strips and various devices actuated by said rollers.

Figures 1, 2:
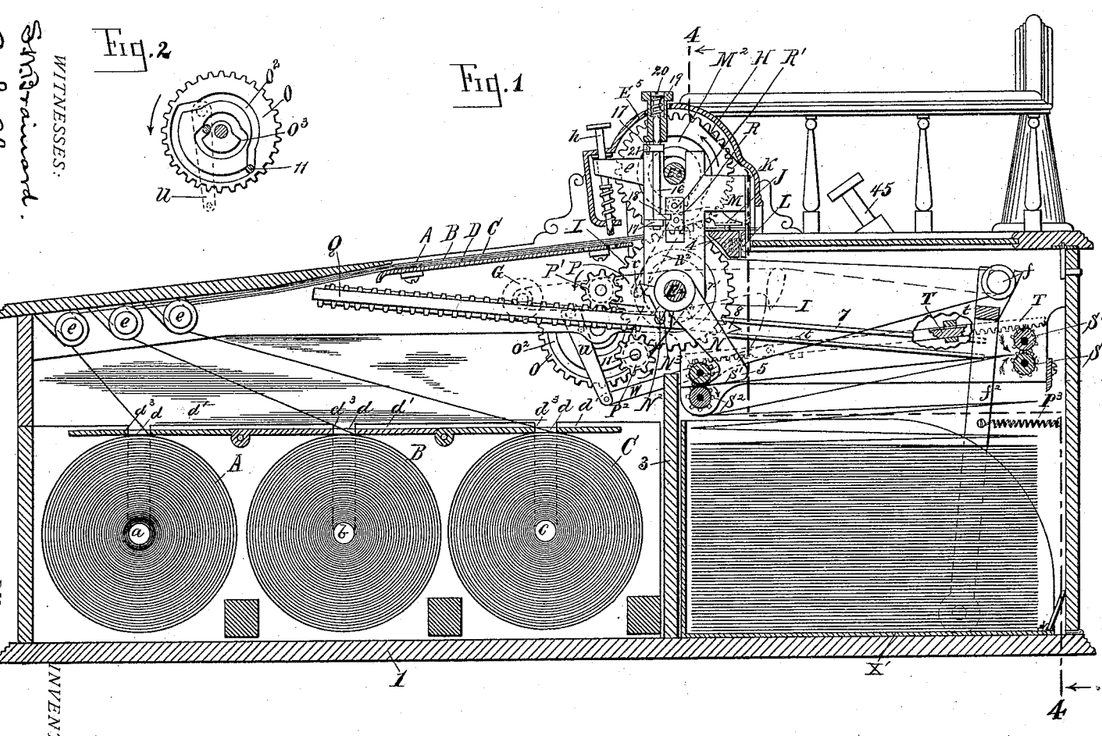
Figure 1 is a vertical section of my improved machine approximately on the line 1—1 of Fig. 4.
Fig. 2, a detail view of one of the cam disks.
Figures 7, 8, 9, 10, 11, 12, 13:
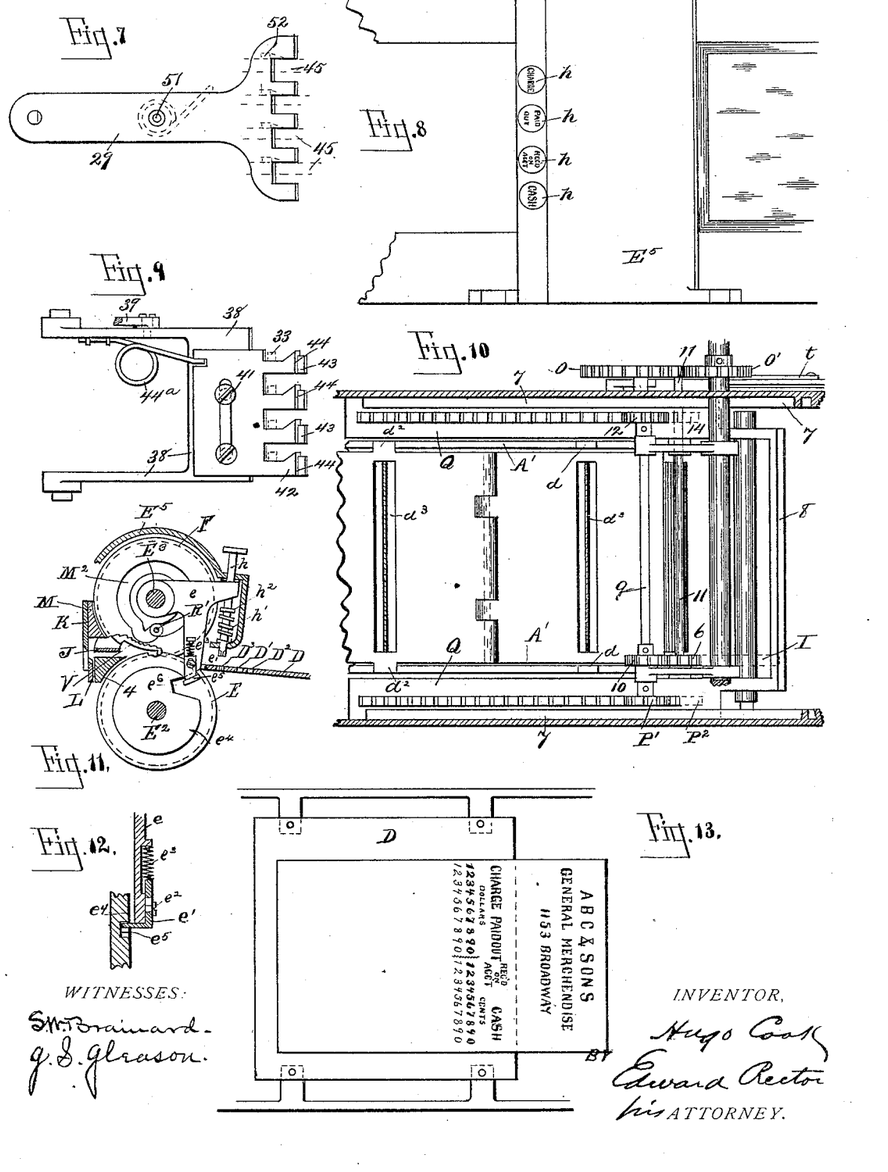
Fig. 7, a detail plan view of the lock-releasing frame controlled by the keys.
Fig. 8, a detail top plan view of part of the casing, showing the special keys.
Fig. 9, a detail plan view of the indicator-lifting frame.
Fig. 10, a detail horizontal section of a part of the machine above the supply rolls of the paper strips.
Fig. 11, a detail side elevation of the feed-rollers and the cam disks carried by them and the keys and locking mechanism.
Fig. 12, a sectional detail of the locking device in Fig. 12.
Fig. 13, a plan view of the writing tablet with a printed check upon it.

The two check-strips A B and the record-strip C are carried in supply-rolls mounted upon spindles $a\ b\ c$, which rest at their opposite ends in the bottoms of vertical slots $d$ in supporting side plates A', Figs. 1 and 10. Resting upon the respective rolls are friction plates $d'$ hinged together and held in position by end lugs $d$ upon the middle one fitting in the slots in which the ends of the spindle $b$ rest. Each plate is provided with a transverse slot $d^3$ above the roll upon which it rests, Fig. 10, through which slot the paper strip is passed and led upward and forward over its guide-roller $e$. The friction between these gravity plates and the rolls offers sufficient resistance to the turning of the latter to hold the strips taut as they are drawn over the writing tablet by the feed rollers, and the means of connecting and supporting the plates permit each one to accommodate itself to the size of the roll upon which it rests.

Figure 16:
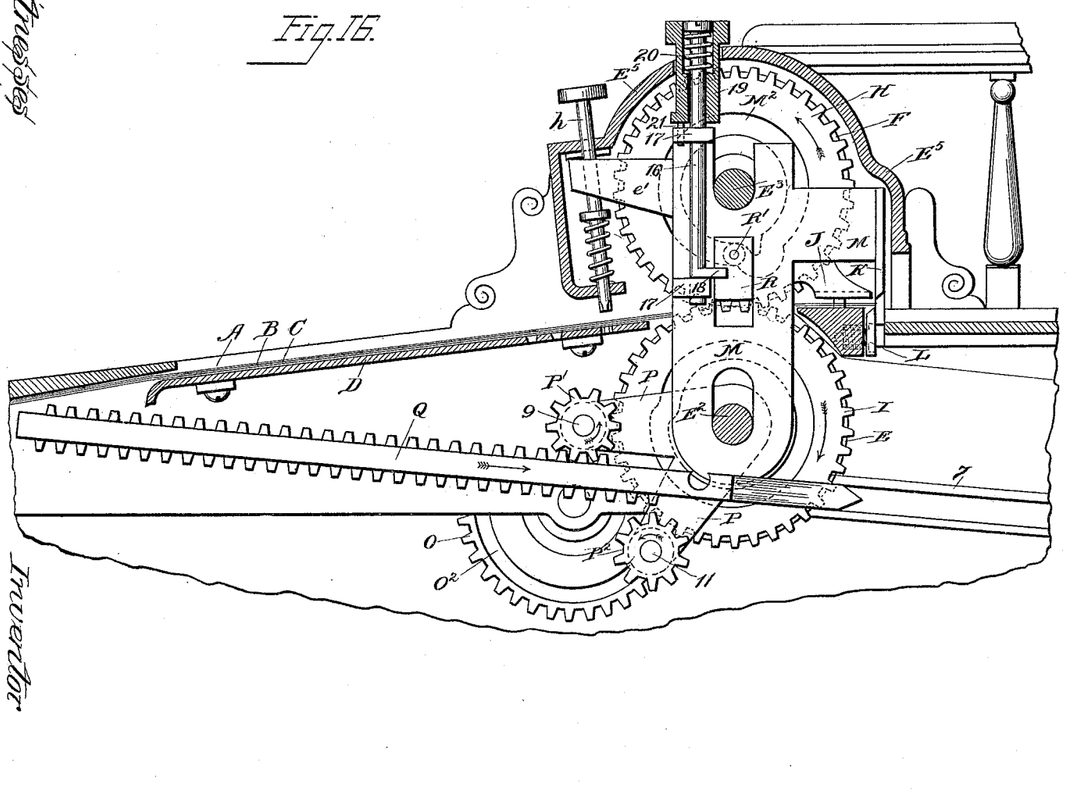
Fig. 16, an enlarged detail view of some of the parts shown in Fig. 1.
Figure 17:
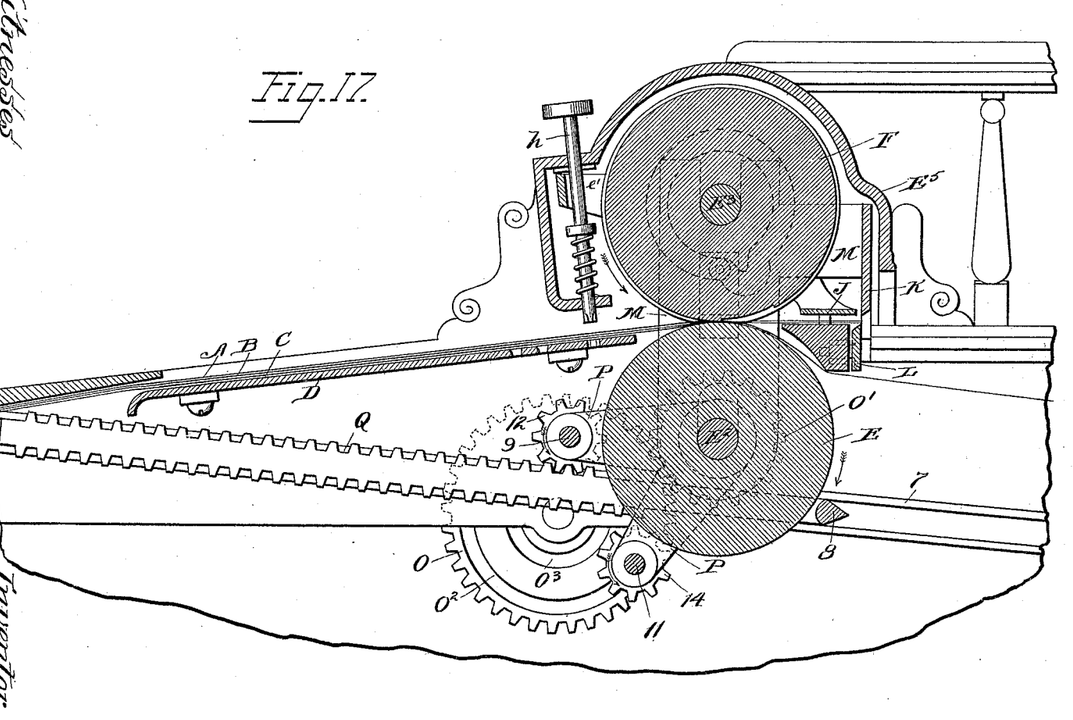
Fig. 17 an enlarged vertical section through the same portion of the machine.

From the guide-rollers $e\ e\ e$ the strips are led over the usual writing tablet D and thence between the feed-rollers E F, Figs. 1, 16 and 17. The roller E is fast upon a rotary shaft $E^2$ having fast upon its right hand end, outside the casing, an operating handle G, Figs. 3 and 5, while the roller F is fast upon a shaft $E^3$. These shafts are journaled at their opposite ends in bearings in the side plates of a supplemental casing $E^5$ consisting of a semicylindrical upper portion containing the upper feed roller, and two side plates depending into the main casing, Fig. 4, and serving to support various parts of the mechanism hereinafter described. At their right hand ends the feed-rollers have fast upon them a pair of intermeshing gears H I by which the movement of the roller E is transmitted to the roller F.

From the feed-rollers the two upper strips pass beneath a clamping plate J and thence between a pair of shearing blades K L, the former carried by a vertically reciprocating frame M hereinafter described and the latter secured upon the rear side of a cross bar 4 of the frame-work. From the feed-rollers the under strip passes beneath the cross bar 4, thence rearward around a tension roller $f$ journaled in the upper ends of the side arms $f^2$ of a swinging frame, hinged at their lower ends to lugs upon the bottom of the casing, Fig. 4, and pulled rearward by a coiled spring $P^3$.

Figures 6, 6A:
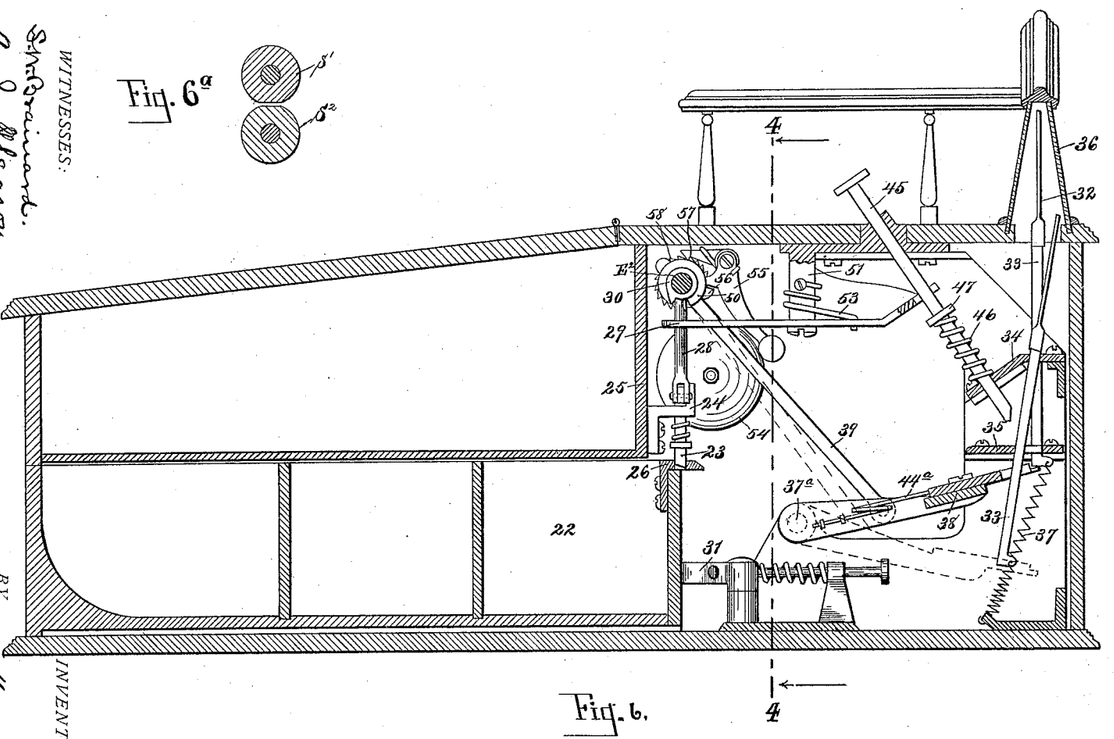

From the roller $f$ the strip is led forward over a swinging folding blade 5 hung by side arms N upon the shaft $E^2$ of the lower feed roller. This folding blade co-operates with a pair of gripping rollers $S' S^2$, Fig. $6^a$, geared together by intermeshing gears, Fig. 1. From this pair of gripping rollers the strip passes rearward to a second similar pair, $S^3 S^4$, and thence downward into the storage tray $X'$ in which it is filled in reverse folds.

Mounted in guideways 7 upon the side walls of the compartment is a backwardly and forwardly reciprocating frame composed of two side arms Q fitting in the guideways, Figs. 1, 5 and 10, and an integral cross-bar or blade 8 uniting their rear ends and having a beveled rear edge adapted to force the strip between the rollers $S^3 S^4$ when the frame is slid rearward to its limit of movement.

In the operation of the machine the blade 5 is swung forward and the strip carried between the rollers $S' S^2$, whereupon said rollers are turned slightly to grip the fold of the strip and draw it between them. Then the blade 5 will be swung upward to the position indicated by the dotted lines and the sliding frame moved rearward, its blade 8 carrying the strip before it and forcing it between the rollers $S^3 S^4$, which thereupon are turned slightly in the direction of the arrows, to grip the fold of the strip. Upon the reverse movement of the sliding frame and swinging blade the rollers of the forward pair will be turned backward to first position, to release the fold of the strip held by them and to receive another fold as the blade 5 carries it between them. At the next upward movement of the blade 5 and rearward movement of the sliding frame the rollers of the rear pair will be turned back to first position, to release the fold of the strip held by them and receive the next fold. Thus, the strip is carried backward and forward from one pair of gripping rollers to the other and alternately gripped and released by them, and then allowed to drop in reverse folds into the storage compartment. The co-operating surfaces of the rollers of each pair are flattened or cut away, as seen in Fig. $6^a$, to cause them to more readily receive and grip the fold of the strip when it is carried between them.

The means for reciprocating the sliding frame and swinging folding blade and actuating the gripping rollers may now be described.

Loosely hung upon the shaft $E^2$ at the right hand end of the lower feed-roller, Figs. 1 and 16, are two integral divergent arms P P, while loosely hung upon said shaft at the opposite end of the roller are two similar arms, Figs. 10 and 17.

Journaled in the outer ends of the two upper arms, Fig. 10, is a rotary shaft 9, having fast upon it near its right hand end a pinion 10 which meshes with the gear I upon the lower feed-roller. The two lower arms P have journaled in their outer ends a similar shaft 11 having fast upon it a pinion 6 also meshing with the gear I.

Fast upon the extreme right hand end of the shaft 9 is a pinion P', Figs. 1, 10 and 16, adapted to be thrown into mesh with a rack upon the upper side of the right hand side arm Q of the reciprocating folding frame, while fast upon the shaft near its left hand end is another pinion 12 adapted to be thrown into mesh with a rack upon the upper side of the left hand arm Q. The shaft 11 has fast upon it two pinions $P^2$ 14, co-incident with the pinions P' 12, and adapted to be thrown into mesh with racks upon the under sides of the arms Q.

When the feed-roller E is turned by its handle G the pinions will be turned in the direction of the arrows, Figs. 1 and 16 and if the pinions P' 12 be engaged with the racks upon the upper sides of the arms Q the latter will be slid rearward and the blade 8 caused to carry the paper strip between the rear gripping rollers $S^3 S^4$, while if the lower pinions $P^3$ 14 be engaged with the racks upon the under sides of the arms Q the latter will be slid forward. By swinging the arms P upward and downward and alternately engaging the pinions with the racks upon the lower and upper sides of the arms Q the rotation of the feed-roller will be caused to reciprocate the sliding frame back and forth.

Fast upon the shaft $E^2$ at the left of the feed-rollers, Figs. 4 and 10, is a pinion O' meshing with a gear wheel O mounted upon a stub shaft secured to the side of the supplemental casing $E^5$. This gear has two cam grooves $O^2 O^3$ formed in its right hand side, Figs. 2, 16 and 17, in the former of which fits the extreme left hand end of the rotary shaft 11, carried by the lower pair of arms P. The shape of the cam groove $O^2$ is such that at each complete revolution of the gear O the arms P P will be vibrated upward and downward to alternately engage the pinions with the racks upon the under and upper sides of the arms Q. Thus, with the gear in the normal position shown in the drawings the arms P will remain stationary while the gear makes the first half of a revolution, with the pinions engaged with the upper racks, so that the reciprocating frame will be slid rearward. At the end of such half revolution the arms P will be swung upward and the upper pinions disengaged from the upper racks and the lower pinions engaged with the lower ones, so that during the second half of revolution of the gear the frame will be slid forward. The pinion O' fast upon the shaft $E^2$ of the lower feed roller is half the size of the gear O with which it meshes, so that a complete revolution of the operating handle and feed rollers will turn the gear O only a half revolution. At one revolution of the handle and feed-rollers, therefore, the reciprocating frame will be slid in one direction, and at the next revolution of them it will be slid in the opposite direction. Each of the side arms Q of this frame is provided in its upper surface with a notch $N^3$, Fig. 1, in which fits a lug $N^2$, upon the hub of the adjacent side arm N of the swinging blade 5. When the frame is slid rearward the arms N and blade 5 will therefore be swung upward to the position indicated by the dotted lines, and when it is slid forward they will be swung downward to cause the blade to carry the paper strip between the rollers $S'$ $S^2$.

The means for actuating the rollers $S'$ and $S^2$, and $S^3$ and $S^4$, to cause them to alternately grip and release the paper strip in the manner described consists of a reciprocating rack bar T, Figs. 1 and 4, mounted in guides $t\,t$ upon the left hand side of the casing $E^5$ and engaging the pinions upon the upper rollers of the respective pairs. This rack bar is connected by a link W to the lower end of a swinging arm U hung at its upper end to the side of the casing, Figs. 1 and 2, and provided with a stud 15 fitting in the cam groove $O^3$ in the gear O. The shape of the groove and its arrangement in relation to the groove $O^2$ are such that just as the sliding folding frame reaches the rearward limit of its movement and the blade 8 carries the strip between the rollers $S^3$ $S^4$ the rack-bar T will be drawn slightly forward and the rollers thereby turned in the direction of the arrow, to grip the strip, while the rollers $S'$ $S^2$ will be simultaneously turned in the direction of the arrow beside them to release the opposite fold of the strip. At the end of the second half of the revolution of the gear O the rack bar T will be slid forward and the rollers $S'$ $S^2$ turned to grip the strip as it is carried between them by the blade 5, while the rollers $S^3$ and $S^4$ will be turned at the same time to release the fold of the strip held by them.

From this description it will be understood that, with the parts in the position shown in the drawings, at the first operation of the machine, to-wit: the first complete revolution of the operating handle, the folding blade 5 will be swung up to the position shown by the dotted lines, Fig. 1, the blade 8 slid rearward, carrying the paper strip before it into the gripping rollers $S^3$ $S^4$, and the latter closed upon it, while the rollers $S'$ $S^2$ will be turned to release the fold of the strip held by them; and that at the next operation the blade 8 will be slid forward, the blade 5 swung downward, carrying the strip between the rollers $S'$ $S^2$, and the latter closed upon it, while the rollers $S^3$ $S^4$ will be turned to release the previous fold of the strip.

Having now described the means for disposing of the record-strip the means for severing the check-strips into detached checks may be next described. As before stated the two upper strips—the check-strips—pass from the feed-rollers rearward over a fixed cross bar 4 and beneath a clamping plate J, Fig. 1, and thence between a fixed knife-blade L secured to the rear side of the bar 4 and a vertically reciprocating blade K carried by a frame M. This frame consists of two vertical side plates, Figs. 1, 4 and 16, provided with vertical slots embracing the shafts $E^2$ and $E^3$ of the feed-rollers, at opposite ends of the same, by which shafts the frame is supported and guided in its vertical movements; and the knife-blade K rigidly connecting the rearwardly projecting arms of such side plates.

Fitted in a rectangular opening in each side plate of this frame is a vertically movable block R, Figs. 1, 4, 5 and 16. The one at the right hand end of the feed-roller has a stud $R'$ projecting into a cam groove $M^2$ in the side of the gear H, Figs. 1, 4 and 16, while the one at the left hand end thereof is provided with a similar stud fitting in a similar groove in the left hand end of the feed roller F, Figs. 4, 5 and 11.

It will be seen that if one or both of the blocks R be rigidly connected to the frame M the rotation of the roller F will reciprocate the frame U vertically to cause the blade K to sever the strips passed between it and the blade L. For the purpose of connecting the right hand block with the frame and disconnecting it at will, to cause the rotation of the roller to reciprocate the frame or not, as desired, there is provided a latch consisting of a vertical rod 16 mounted in bearings 17 upon the side of the frame M, Figs. 1, 4, 5 and 16, and provided with a lug 18 adapted to be engaged with and disengaged from a corresponding recess in the block R as the rod 16 is turned in one direction or another.

The rod 16 has splined upon its upper end a sliding thumb piece 19 by which it may be turned. This thumb piece is pressed downward by a spring 20 confined in its bore and bearing against a head upon the upper end of the rod 16, and has a pendent pin 21 which co-operates with perforations in the upper bearing 17 of the rod, Fig. 5, to hold the latter in its different positions, with its lug 18 either engaged with or disengaged from the recess in the block R.

In the position of the parts shown in the drawings the block R is rigidly connected with the frame M by the latch, so that the rotation of the roller will reciprocate the frame M, but by lifting the thumb-piece 19 until the pin 21 is disengaged from the hole in the bearing 17 and then turning it until the lug 18 on the rod 16 is disengaged from the recess in the block R, the block and frame will be disconnected, so that the rotation of the roller will simply reciprocate the block idly up and down in the rectangular opening in which it fits. The purpose of this provision for connecting and disconnecting the block and frame is to enable the cutting mechanism to be thrown out of operation at will, as when it is desired to deliver checks of double length; but for this the blocks R and associated devices might be dispensed with and the side plates of the frame M be provided with rigid studs projecting into the cam grooves $M^2$.

The shape of the cam grooves is such that the frame M will be depressed just at the end of the operation of the machine, and the feed roller F is provided with a flattened or cut-away portion at V, Fig. 11, which comes opposite the roller E at such time, so that the feeding of the strips is arrested while the checks are being severed.

The paper clamp J heretofore referred to consists of the cross bar J and its supporting side arms $R^2$ and $R^3$ pivoted to the blocks R, Fig. 5. The left hand arm $R^2$ is provided with a downwardly and forwardly extending portion, Figs. 1 and 5, provided near its lower end with a stud $r$ fitting in a cam groove $r'$ in the side of the gear I, Fig. 1. When the frame M is depressed the clamp J will be depressed with it, clamping the strips between it and the cross bar 4. As the feed-rollers approach the end of their revolution the cam groove $r'$ in the gear I will rock the arm $R^2$ of the clamp J and lift the latter slightly, to permit the frame M to descend to its limit of movement, the clamps continuing to bear upon the strips upon the bar 4, the rocking movement of the arm $R^2$ simply accommodating the full movement of the frame.

The clamp J is provided upon its under side with the guide-pins $r^2 r^3$ between which the strips pass, and which enter holes in the bar 4 when the clamp is depressed.

Mounted in the casing $E^5$ in front of the upper feed-roller F are four canceling keys or punches $h$ passed through guide apertures in the casing and adapted to co-operate at their lower ends with four holes $D^3$ in the writing tablet D, Figs. 1, 8 and 11. The key buttons upon the outer ends of these keys, Fig. 8, bear words or signs indicating different classes of transactions, as credit and cash sales, amounts paid in on account and amounts paid out on account, and the checks upon the check-strips have printed upon them corresponding words or signs as seen in Fig. 13. At the beginning of the operation of the machine these words or signs upon the check-strip rest immediately beneath the respective keys, so that upon depressing any one of the keys until its lower end passes through the strips and enters the co-incident hole in the writing tablet the sign beneath the key will be canceled or mutilated and the character of the transaction thereby indicated upon the check. Thus in Fig. 13 the cash key has been operated to indicate a cash sale. In case the lower strips are not printed the characters of the different transactions may still be indicated upon them by the canceling keys by providing said keys with punches representing different letters or characters and providing the writing tablet with perforations of corresponding shapes to co-operate with them. The check-strips have also printed upon them two or more series of numbers by which the amount of the transaction may be indicated. In Fig. 13 there are shown four sets of numbers, each containing the nine digits, the two sets in the left hand column representing units and tens of dollars, respectively, and the two sets in the right hand column representing units and tens of cents, respectively. The writing tablet is provided with a series of holes $D' D^2$ beneath the numbers, to permit a pencil or other pointed instrument to be pressed through the strips to cancel different numbers.

Figure 14:
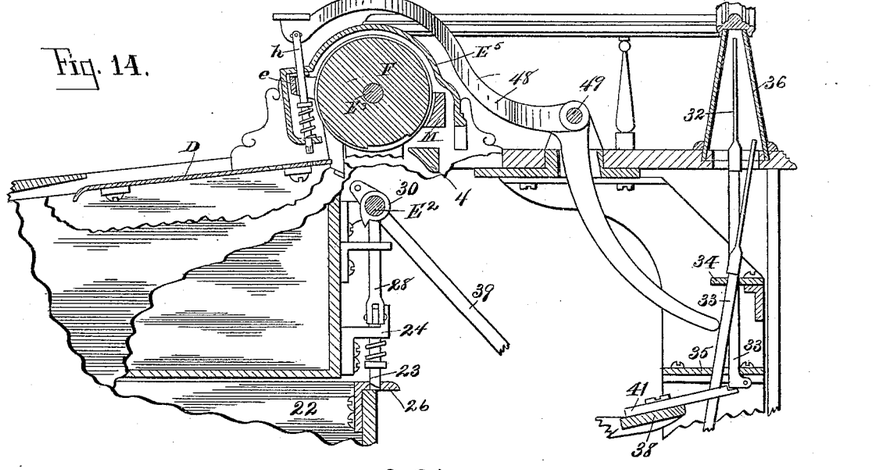
Figs. 14 and 15, sectional and plan views, respectively, showing a modified form and arrangement of the keys.

Loosely hung upon the shaft $E^2$ by side arms at the opposite ends of the roller F is a frame $e$, Figs. 1 and 11, consisting of the two side arms and a front cross bar uniting them, Fig. 14. The keys $h$ have pins $h^2$ passed through them above this cross-bar, which pins, when the keys are depressed, carry the cross-bar with them and rock the frame. The keys have resetting springs $h'$ coiled around them and confined between collars upon them and their lower bearings, Fig. 11.

The left hand side plate of the frame $e$ has a depending portion upon which is mounted a vertically sliding plate $e'$ having an inwardly bent lower end, Fig. 12, adapted to co-operate with a notched disk $e^4$ and lug $e^5$ fast upon the end of the roller E. A coiled spring $e^3$ confined between the upper end of the plate $e'$ and a lug upon the frame $e$ presses said plate downward, but in the normal position of the parts the lug $c^5$ abuts against the lower end of the plate and holds it in its upper position, Fig. 11. The roller E is thereby locked from turning in the direction of the arrow and the machine consequently locked from operation. When one of the keys $h$ is depressed and the frame $e$ rocked upon its pivotal support the plate $e'$ slides rearward off the lug $e^5$ into a notch $e^6$ in the disk $e^4$ and when it clears said lug the spring $e^3$ throws it downward behind the lug. This will unlock the roller E and permit it to be turned, the beveled lower side of the notch $e^6$ forcing the plate $e'$ outward as the roller turns and swinging the frame e upward to normal position. When the roller is turned until the notch is carried away from the plate $e'$ the latter will ride upon the periphery of the disk $e^4$ until the roller completes its revolution and is arrested by contact of the lugs $e^5$ with the plate $e'$ as in Fig. 11. In this manner the machine is normally locked from operation, and can be released only by pressing in one of the keys $h$ and canceling a sign upon the check-strip.

As before stated, the money-drawer and the indicating mechanism are located in the left hand compartment of the casing. The money-drawer 22 is normally locked by a spring-pressed vertically sliding bolt 23 mounted in a bracket plate 24 secured upon the rear side of a division wall 25 of the casing and engaging at its lower end a locking plate 26 upon the rear wall of the drawer, Figs. 3, 4 and 14. The bolt 23 is pivoted at its upper end to one end of a lever 27 fulcrumed near its middle upon the plate 24 and carrying at its opposite end a vertical rod 28 projecting upward through a guide plate 29 into the path of a cam 30 fast upon the shaft $E^2$ of the lower feed roller, which shaft is extended to the left into the left hand compartment of the casing. When the shaft is turned the cam 30 will depress the rod 28 and lift the bolt 23 and release the drawer, which will then be thrown open by a spring-pressed pivoted arm 31 behind it.

The indicators 32 are carried upon the upper ends of rods 33 which are mounted in guide plates 34 35 to slide vertically and also swing backward and forward at their lower ends, Fig. 6. When elevated they are exposed to view in a glass sight chamber 36. Coiled springs 37 connected to their lower ends tend to pull them downward and their lower ends forward.

Pivotally supported by its side arms at $37^a$ is a lifting frame 38 composed of its side-arms and a cross plate uniting their rear ends, Fig. 9. This frame is connected by a pitman 39 with a crank 40 interposed in the shaft $E^2$, Fig. 4, so that rotation of the shaft will reciprocate the frame.

Mounted to slide laterally upon the frame 38 is a spring-pressed plate 41 provided with a series of rearwardly projecting fingers 42, one for each indicator rod. These fingers 42 are cut away upon their left hand sides, as seen in Fig. 9, forming recesses having inclined rear sides, while the rear ends of the fingers are provided with lugs or lifting projections 43 forming shoulders 44 upon the ends of the fingers above such projections. The indicator rods normally rest in the recesses in the left sides of the fingers 42, as indicated by the dotted lines in Fig. 9, the spring $44^a$ pressing the plate 41 to the left against the indicators. If the lower end of any of the indicator rods be pressed rearward it will force the plate 41 to the right as it rides over the inclined rear side of the recess in which it normally rests and when it clears the rear end of the finger 42 the plate 41 will be pressed to the left by its spring until the lug 43 upon the rear end of the finger contacts with the rod, whereupon the rod will be held in this rear position by the projecting end of the finger at the left of the lug. If the frame 38 be then lowered until it reaches the position indicated by the dotted lines in Fig. 6 the lug 43 will be carried just below the lower end of the rod, thereby permitting the spring to move the plate 41 still farther to the left and carry the lug beneath the rod. If the frame be then lifted to its normal upper position the lug will lift the rod with it and carry the indicator to the position of the vertical one in Fig. 6 and expose it to view in the sight chamber 36.

For the purpose of pressing the lower ends of the indicator rods rearward and engaging them with the shoulders upon the rear ends of the fingers of the lifting plate there is provided a series of keys 45 mounted in inclined position in suitable guide-ways and surrounded by coiled springs 46 bearing against collars 47 fast upon them and adapted to yieldingly hold them in and return them to normal position. Upon pressing in any one of these keys its co-operating indicator will be set, and upon then giving the operating handle a complete revolution and thereby lowering and raising the frame 38 the set indicator will be lifted to exposed position.

At each operation of the machine the previously exposed indicator is released and withdrawn from view by its spring 37 as soon as the newly operated key is pressed in and the plate 41 upon the lifting frame thereby slid to the right until the lower end of the rod of the exposed indicator is disengaged from the finger 42 which had been supporting it.

As seen in Fig. 3 the indicators 32 bear words or signs indicating different classes of transactions as before explained in connection with the canceling keys $h$, and the finger buttons of the keys 45 just described bear similar words or signs.

Figure 15:
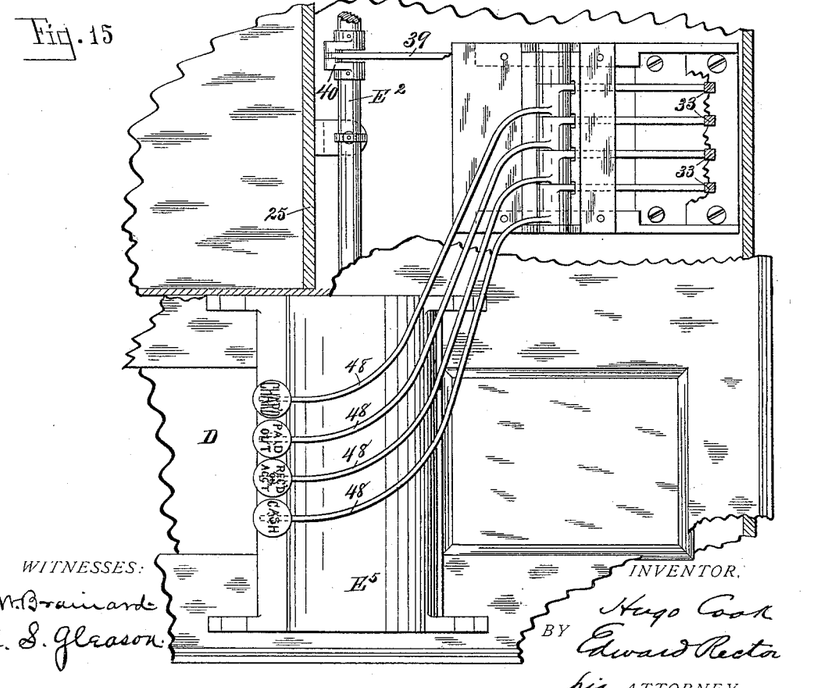

If desired, the operation of the canceling keys may be made to set the indicators, and the keys 45 be dispensed with, as seen in Figs. 14 and 15. As there shown the upper ends of the canceling keys are connected to the front ends of bent levers 48 fulcrumed upon a shaft 49 and having their rear ends extended downward into position to engage the indicator rods and press them rearward when the front ends of the levers are depressed.

In Fig. 6 there is shown a lever controlled by the keys 45 for preventing operation of the feed-rollers until one of the keys has been pressed in and an indicator set. This lock consists of a notched disk 50 fast upon the shaft $E^2$ beside the cam 30. The upper end of the rod 28 normally rests in the notch in this disk and locks the shaft from movement.

The plate 29 before referred to, through which the upper end of the rod 28 passes, is fulcrumed upon a support 51 depending from the top of the casing and its rear end is widened and slotted as seen in Fig. 7. The keys 45 pass through these slots and each key has upon its side a cam 52, Fig. 3 and dotted lines Fig. 7, adapted to force the rear end of the plate to the left when the key is pressed in and throw its front end to the right and carry the rod 28 out of the notch in the locking disk 50. A spring 53 secured to and coiled around the pendent support 51, and bearing against the plate 29 yieldingly holds the latter in normal locking position.

The machine is provided with an alarm gong 54 arranged to be sounded by a spring-pressed striker 55 actuated by a cam 56 fast upon the shaft $E^2$, Figs. 3 and 6.

A pawl 57 engaging a ratchet 58 fast upon the extreme left hand end of the shaft $E^2$, Fig. 6, prevents the operating handle and feed-rollers being turned backward.

Having thus fully described my invention, I claim—

1. In an autographic register, the combination, with the supply rolls of the paper strips, of the gravity friction plates hinged together and resting one upon each roll, and each provided with a slot for the passage of the paper strip, substantially as described.

2. In an autographic register, the combination, with the supply rolls of the paper strips, of the gravity friction plates hinged together and resting thereon, each provided with a slot for the passage of the paper strip and one of them provided with projections at its opposite ends fitting in vertical guideways, substantially as described.

3. In an autographic register, the combination, with the vertically slotted supporting plates, the supply rolls of the paper strips mounted upon spindles resting at their opposite ends in the vertical slots in said plates, and the hinged gravity friction plates resting upon the rolls and provided with the slots for the passage of the strips and the middle one provided with the end lugs fitting in the vertical slots in the supporting plates, substantially as described.

4. In an autographic register, the combination of two opposite pairs of gripping rollers, means for carrying the paper strip alternately between the rollers of the opposite pairs, and means for oscillating said rollers to cause them to alternately grip and release the strip, substantially as described.

5. In an autographic register, the combination of two opposite pairs of gripping rollers, two reciprocating blades co-operating with the respective pairs of rollers to carry the paper strip alternately between the rollers of the opposite pairs, and means for oscillating the rollers to cause them to alternately grip and release the strip, substantially as described.

6. In an autographic register, the combination of two opposite pairs of gripping rollers, two reciprocating blades co-operating therewith to carry the paper strip alternately between the rollers of the opposite pairs, a rotary operating handle, and means actuated thereby for reciprocating the blades and oscillating the gripping rollers, substantially as described.

7. In an autographic register, the combination of two opposite pairs of gripping rollers, two reciprocating blades co-operating therewith to carry the paper strip alternately between the rollers of the opposite pairs, a pair of feed rollers for advancing the paper strip, and a single operating handle and connections for turning the feed rollers, reciprocating the blades and oscillating the gripping rollers, substantially as described.

8. In an autographic register, the combination of a pair of feed-rollers for advancing the strip, an operating handle for turning them, two opposite pairs of gripping rollers, two reciprocating blades co-operating therewith to carry the paper strip alternately between the rollers of the opposite pairs, and means actuated by one of the feed-rollers for reciprocating said blades and oscillating the gripping rollers, substantially as described.

9. In an autographic register, the combination, with two opposite pairs of gripping rollers, of a sliding blade co-operating with one pair and a swinging blade co-operating with the other pair, to carry the paper strip alternately between the rollers of the opposite pairs, and means for reciprocating the blades and oscillating the rollers, substantially as described.

10. In an autographic register, the combination, with two pairs of gripping rollers, of two reciprocating blades co-operating therewith to carry the paper strip alternately between the rollers of the opposite pairs, connections between the blades for causing one to actuate the other, and means for reciprocating one blade and for oscillating the gripping rollers, substantially as described.

11. In an autographic register, the combination, with two pairs of gripping rollers, of a sliding blade co-operating with one pair and a swinging blade co-operating with the other pair, to carry the paper strip alternately between the rollers of the opposite pairs, connections between the blades for causing the sliding blade to actuate the swinging blade, and means for reciprocating the sliding blade, and oscillating the gripping rollers, substantially as described.

12. In an autographic register, the combination of two opposite pairs of gripping rollers, a sliding blade co-operating with one pair of rollers and a swinging blade actuated by the sliding blade and co-operating with the other pair, to carry the paper strip alternately between the rollers of the opposite pairs, a rotary gear, a pair of pinions meshing with said gear and adapted to be alternately engaged with racks upon opposite sides of the sliding blade, and means for rotating the gear and moving the pinions about its axis to engage them with and disengage them from the racks, and means for oscillating the gripping rollers, substantially as described.

13. In an autographic register, the combination of two opposite pairs of gripping rollers, two reciprocating blades co-operating therewith to carry the paper strip alternately between the rollers of the opposite pairs, a reciprocating rack bar engaging a pinion upon one roller of each pair, and means for reciprocating the blades and rack bar, substantially as described.

14. In an autographic register, the combination of two opposite pairs of gripping rollers, two reciprocating blades co-operating therewith to carry the paper strip alternately between the rollers of the opposite pairs, a reciprocating rack bar engaging a pinion upon one roller of each pair, a rotary cam disk, connections between the same and the rack bar for reciprocating the latter, and means for rotating the disk and reciprocating the blades, substantially as described.

15. In an autographic register, the combination of two opposite pairs of gripping rollers the opposing surfaces of the rollers of each pair being flattened or cut away, means for carrying the paper strip alternately between the rollers of the opposite pairs, and means for oscillating the rollers to cause them to alternately grip and release the strip, substantially as described.

16. In an autographic register, the combination of a fixed cutting blade, a reciprocating frame carrying a cutting blade co-operating with the fixed blade, a rotary disk provided with a cam groove, a stud carried by the reciprocating frame and movable relatively thereto and projecting into the cam groove, and means for rigidly connecting said stud with the reciprocating frame at will to cause the rotation of the cam disk to reciprocate said frame and its cutting blade, substantially as described.

17. In an autographic register, the combination of a pair of feed rollers, a fixed cutting blade, a reciprocating frame mounted upon and guided by the shafts of the two feed rollers and carrying a cutting blade co-operating with the fixed blade, a sliding block mounted in said frame and provided with a stud projecting into a cam groove upon the end of one of the feed rollers, and a latch for connecting said block with and disconnecting it from the reciprocating frame at will, substantially as described.

18. In an autographic register, the combination, with the feed rollers and the cutting mechanism, of a vibrating clamping plate actuated by one of the feed rollers and provided with guide pins for guiding the paper strip and operating to clamp the strip adjacent the cutting point while the cutting is being done, substantially as described.

19. In an autographic register, the combination, with the feed rollers and the fixed cutting blade, of a reciprocating frame carrying the movable blade, a vibrating clamping plate pivoted in said frame and operating to clamp the paper strip between the cutting point and feed rollers while the cutting is being done, and a rotary disk having a cam groove engaged by a stud upon the clamping plate for vibrating the latter, substantially as described.

20. In an autographic register, the combination of a writing tablet provided with a series of perforations, at one end and exposed through an opening in the casing for the entry of memoranda upon the check strips led over it and a series of canceling keys or punches representing different classes of transactions arranged at one end of the opening in the casing and adapted to co-operate with the perforations in the tablet and for the purpose described.

21. In an autographic register, the combination of a writing tablet provided with a series of perforations, a series of canceling keys or punches representing different classes of transactions and adapted to co-operate with the perforations in the tablet, a pair of feed rollers for advancing the paper strips, and a lock co-operating therewith and controlled by the keys for preventing operation of the machine without first operating a key, substantially as described.

22. In an autographic register, the combination of a writing tablet provided with a series of perforations, exposed through an opening in the casing for the entry of memoranda upon the paper strips led over it a series of canceling keys or punches representing different classes of transactions and adapted to co-operate with the perforations in the tablet, and a series of indicators representing the different classes of transactions and co-operating with the canceling keys or punches, substantially as described.

23. The combination, with the indicators supported upon the rods adapted to be moved vertically and swung backward and forward at their lower ends, and the spring for yieldingly holding said rods in and returning them to normal position, of the vertically movable lifting frame carrying the spring-pressed laterally sliding plate provided with the beveled lifting fingers having the lugs upon their rear ends, and the keys for moving the indicator rods into position to be engaged and lifted by the lifting frame, substantially as described.

24. In an autographic register, the combination of the feed rollers E F geared together by the gears H I, the operating handle G fast upon the shaft of one of said rollers, the two pairs of gripping rollers $S'$ $S^2$ and $S^3$ $S^4$, the tension roller $f$, the reciprocating blade 8 having the side arms Q provided with racks upon their upper and lower sides, the swinging arms P hung upon the shaft of the roller E, the shafts 9 and 11 journaled in the ends of the arms P and carrying the pinions 10 and 6 meshing with the gear I and the pinions P' 12 and P² 14 adapted to be respectively engaged with the racks upon the upper and lower sides of the arms Q, the cam disk O geared to the feed rollers and having a cam groove engaged by the end of the shaft 11, the swinging blade 5 hung upon the shaft of the roller E by side arms N having projections N² engaging notches in the arms Q, the reciprocating rack T engaging pinions on the rollers S' and S³, the pivoted arm U having a stud engaging a second cam groove in the disk O, and the link W connecting the arm U and bar T, substantially as described.

25. In an autographic register, the combination, with the feed rollers E F, the former provided upon one end with the notched disk $e^4$ and lug $e^5$, of the frame $e$ hung upon the shaft of the roller F and provided with the spring-pressed sliding plate $e'$ co-operating with the lug $e^5$ and notch in the disk $e^4$, and the keys $h$ co-operating with the frame $e$, substantially as described.

26. The combination of the rotary shaft E², the indicators 32 carried by the rods 33, the springs 37 connected to the rods 33, the swinging lifting frame 38, the laterally sliding plate 41 mounted thereon and provided with the beveled fingers 42 having the lugs 43 and shoulders 44 at their rear ends, the spring 44ª engaging the plate 41, the crank-and-pitman connection 40, 39, between the shaft E² and frame 38, and the keys for moving the rods 33 into position to co-operate with the lifting frame, substantially as described.

27. The combination of the rotary shaft E², the indicators 32 carried by the rods 33, the springs 37 connected to the rods 33, the swinging lifting frame 38, the laterally sliding plate 41 mounted thereon and provided with the beveled fingers 42 having the lugs 43 and shoulders 44 at their rear ends, the spring 44ª engaging the plate 41, the crank-and-pitman connection 40, 39, between the shaft E² and frame 38, the writing tablet D having the perforations D³, the canceling keys $h$ co-operating therewith, and the levers 48 co-operating with the keys $h$ and indicator rods 33, substantially as described.

28. In an autographic register, the combination of feeding mechanism for advancing the paper strips, cutting mechanism for cutting the check strips into checks, folding mechanism for folding the record strip, and a single operating handle for actuating said mechanisms, to advance the strips, sever the check-strips and fold the record strip, substantially as described.

29. In an autographic register, the combination of a writing tablet, feeding mechanism for drawing the paper strips over the same, mechanism for folding and creasing the record strip, and a single actuating device for the feeding and folding mechanisms making a complete revolution at each operation of the machine, substantially as described.

30. In an autographic register, the combination of a writing tablet, a pair of feed rollers for drawing the check strips and the record strips over said tablet, a series of indicators, and a single operating device for actuating the feed rollers and exposing the indicators, substantially as described.

31. In an autographic register, the combination of a writing tablet, a pair of feed rollers for drawing the check strips and the record strips over the same, a series of indicators, and means intermediate the feed rollers and indicators and actuated by the former for exposing the latter when the rollers are turned to advance the strips, substantially as described.

32. In an autographic register, the combination of a writing tablet, exposed through an opening in the casing for the entry of memoranda upon the paper-strips led over the same feeding mechanism for drawing the paper strips over the tablet, a series of keys, and a lock for the feeding mechanism controlled by said keys, for preventing operation of the same until a key has been operated, substantially as described.

HUGO COOK.

Witnesses:
PEARL N. SIGLER,
GUY FULTON.